United States Patent [19]

Lambarth

[11] 4,195,053

[45] Mar. 25, 1980

[54] METHOD AND APPARATUS FOR BLOW MOLDING CONTAINERS

[75] Inventor: Edwin H. Lambarth, Manchester, Mich.

[73] Assignee: Hoover Universal, Inc., Saline, Mich.

[21] Appl. No.: 955,129

[22] Filed: Oct. 26, 1978

[51] Int. Cl.² ............................................. B29C 17/07
[52] U.S. Cl. ................................. 264/533; 264/540; 425/525; 425/532
[58] Field of Search ................ 264/531, 533, 539–543; 425/525, 532

[56] References Cited

U.S. PATENT DOCUMENTS

| | | | |
|---|---|---|---|
| 3,508,295 | 4/1970 | Hough | 264/531 X |
| 3,781,395 | 12/1973 | Uhlig | 264/542 X |

Primary Examiner—Jan H. Silbaugh
Attorney, Agent, or Firm—Olsen and Stephenson

[57] ABSTRACT

A method and apparatus are disclosed for blow molding a container with an angular neck from a parison of thermoplastic material at a single station at which extrusion of the parison, compression molding of the neck of the container and blowing of the parison occurs. In the method, the mold sections, which have a cavity that defines the container with the angular neck, are pivotally mounted so that the parison can be positioned between the open mold sections in the desired location, and after the mold sections are closed on the parison, the mold sections are pivoted so that the angular neck is aligned to receive a blow pin for performing the compression molding and blowing operations.

12 Claims, 4 Drawing Figures

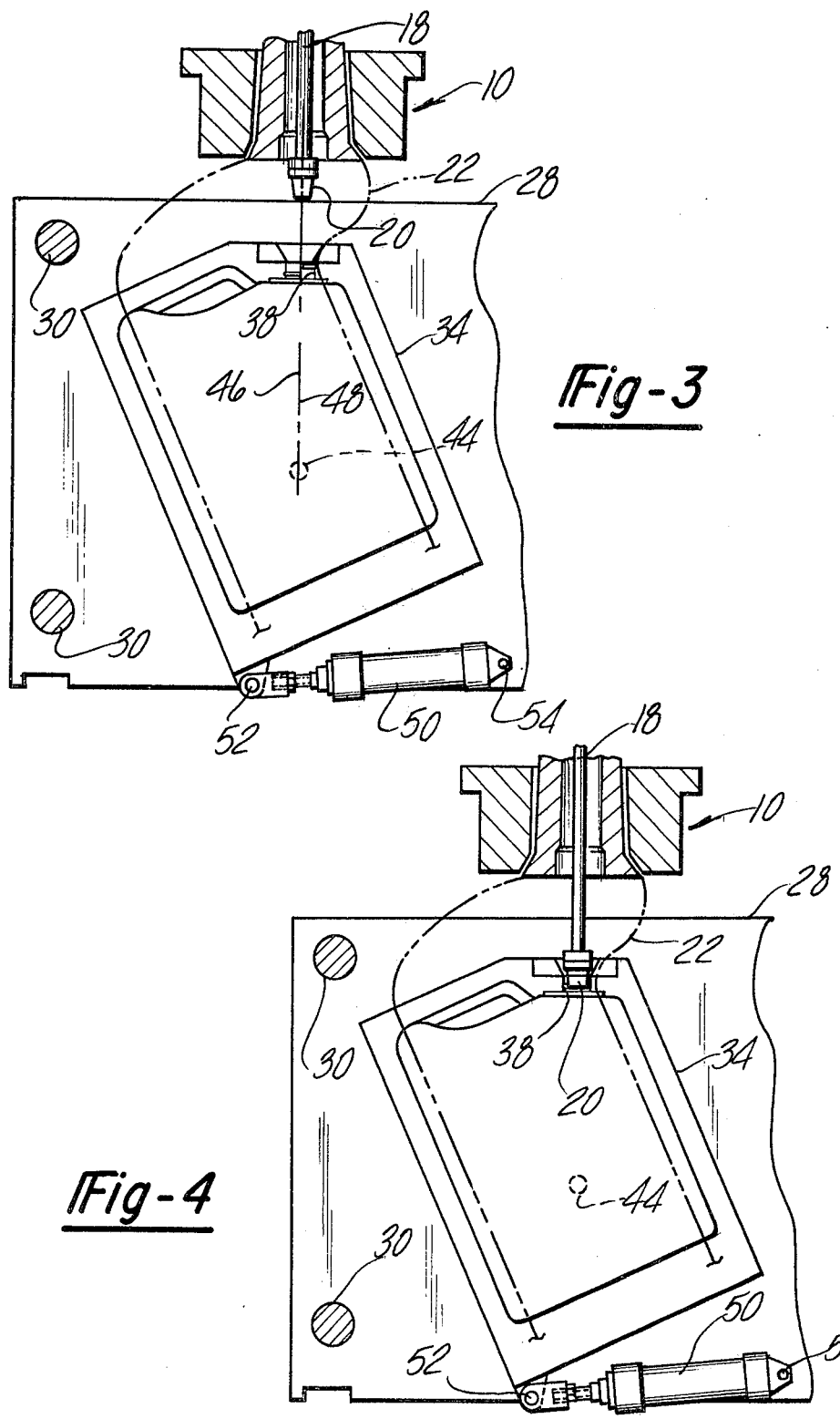

METHOD AND APPARATUS FOR BLOW MOLDING CONTAINERS

BACKGROUND OF THE INVENTION

The present invention relates to blow molding of articles from thermoplastic material, and particularly, to a method of and an apparatus for molding a container which has an angular neck.

It is known to produce containers by blow molding techniques wherein the containers have off-set or angularly disposed necks or spouts. These techniques include multiple stage operations, wherein the parison is extruded and clamped in the mold at one station and a blow pin is inserted into the mold for blowing and/or compression molding of the neck at another station. Techniques of this character increase the cost of the container because of the tooling costs involved and also because they limit the extent of use that can be made of standard extrusion and blow molding apparatus of the type that has a conventional extrusion head with a downwardly opening annular orifice and a coaxially positioned blow pin.

Normally, this standard type of apparatus cannot be used in a satisfactory manner to mold at one station the container with an angular neck, because to do so would require the mold cavity to be aligned so that the angular neck is axially aligned with the blow pin and the annular extrusion orifice. This creates significant problems, especially with respect to irregular wall thicknesses in the blown container.

SUMMARY OF THE INVENTION

The present invention has overcome the inadequacies of prior art methods and apparatus for manufacture of containers that have angular necks.

According to one form of the present invention, apparatus is provided whereby the mold sections are mounted on their associated platens so that they can be moved to either of two positions, one position serving to receive and clamp the parison so that the parison will be located with respect to the mold cavity in the most advantageous position for providing desired distribution of thermoplastic material for the blowing operation, and the second position serving to permit insertion of the blow pin into the neck of the mold cavity.

In a preferred form of the invention, each of the mold sections is mounted on its associated platen by a pivot pin, and a cylinder assembly is operatively connected to the platen and the mold section for rotating or pivoting the mold section between the two positions. The pin is located on the intersection of the vertical axis of the extrusion orifice and the axis of the cavity neck. Thus, the mold can be pivoted to a first position wherein the mold section is in the most advantageous position for receiving and clamping the parison, and to a second position wherein the neck is aligned with the axis of the blow pin to permit the latter to be moved axially into the mold cavity.

This apparatus is constructed and arranged to carry out the preferred method of operation which broadly includes the steps of closing the mold sections onto the parison when the mold sections are in their first positions, moving the closed mold sections relative to the vertical axis of the annular extrusion orifice until the neck axis of the mold cavity coincides with the axis of the blow pin, advancing the blow pin axially into the angular neck of the cavity, blowing the parison into the shape of the cavity, and thereafter opening the mold sections and removing the blown container.

Thus, it is an object of the present invention to provide an improved method of and apparatus for blow molding a container with an angular neck.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is a view similar to that of FIG. 2, but showing one mold section in its second position; and FIG. 4 is a view similar to that of FIG. 3, but showing the blow pin extending into the neck of the neck cavity.

DESCRIPTION OF THE PREFERRED EMBODIMENT

Figure 1:
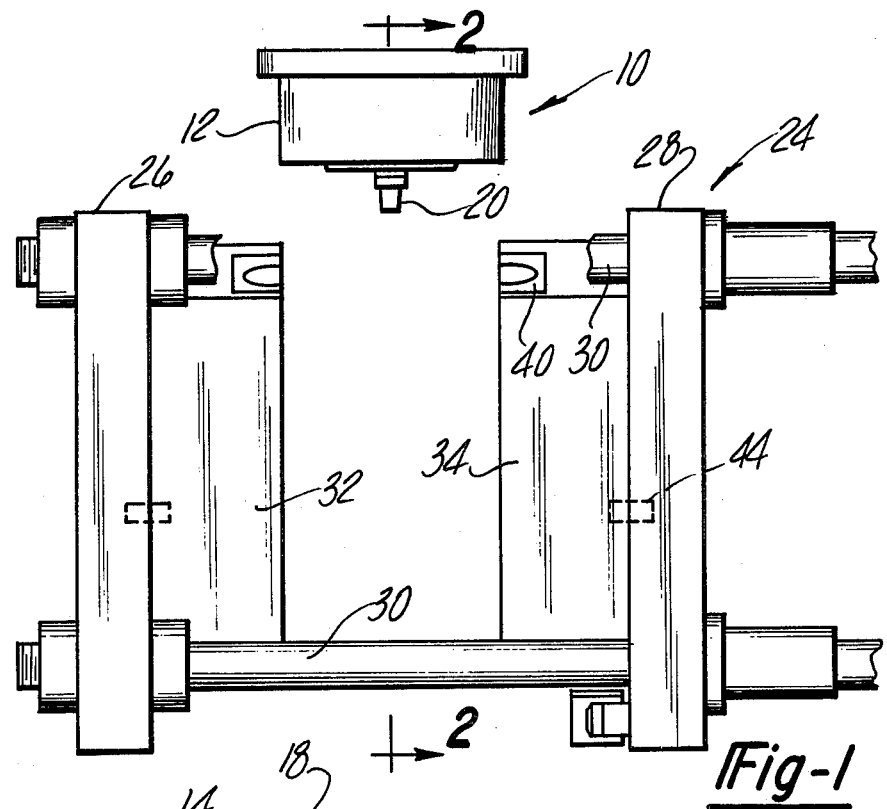
FIG. 1 is a fragmentary side elevational view of an extrusion head and a clamp assembly in which mold sections and platens embodying the present invention are shown in their first positions.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. A conventional extrusion head 10 is shown having an orifice die 12 in which is positioned a vertically extending mandrel 14 that defines with the die 12 an annular extrusion orifice 16. Extending vertically through the mandrel 14 is a blow pin 18 that has a prefinish head 20 at its lower end. In the conventional manner, thermoplastic material can be extruded from the annular orifice 16 to provide a parison, shown in broken lines at 22.

Positioned below the extrusion head 10 is a clamp assembly 24 that includes the platens 26 and 28 that are interconnected by tie bars 30. Mounted on the inner surfaces of the platens 26 and 28 are the mold halves or sections 32 and 34. In the conventional manner, the platens can be moved to an open position, such as is shown in FIG. 1, wherein the mold sections 32 and 34 are in their open positions to permit the parison 16 to be positioned therebetween. The platens 26 and 28 can be closed, not shown, and the inner faces of the mold sections 32 and 34 are then in engagement so as to pinch the parison 22 therebetween in preparation for blowing the container to the shape of the cavity 36, defined within the closed mold sections 32 and 34.

Only the mold section 34 will be described in detail, because the two sections are constructed essentially the same, but they need not necessarily be. The cavity 36 includes the angular neck 38 above which is located the prefinish sheer steel 40 for receiving the blow pin 18 and its finish head 20. The cavity 36 includes a handle portion 42 so that when the parison 22 is extruded into the broken line position shown in FIG. 2, the mold sections 32 and 34 can be closed thereon to enable a container to be blown to the shape of the cavity 36, as will presently be described. It will be observed that the parison 22 extends lengthwise through the cavity 36 so that when the finished product is blown, the wall thickness of the product will be substantially uniform so as to provide a container having desired physical properties.

One of the features of the present invention is the construction and arrangement whereby the mold sections 32 and 34 are mounted on the platens 26 and 28. To facilitate the utilization of the conventional extrusion head 10 to blow the parison in the cavity 36 while still at the extrusion station, the supporting means for the mold sections 32 and 34 are such that the mold sections can be moved on the faces of the platens to the position shown in FIG. 3. This movement occurs after the mold sections 32 and 34 have been closed on the parison, and the parison will then assume the position shown in FIG. 3, and the blow pin 18 will now be aligned so that its finish head 20 can be advanced directly into the neck 38 of the cavity 36. To accomplish this purpose, the mold section 34 is mounted on a pivot pin 44 projecting from the face of the platen 28 so that the mold section can rotate around this pivot. In the preferred form of the invention, the pivot 44 is located on a horizontal axis which intersects the vertical axis 46 of the blow pin 18 and the angular axis 48 of the neck 38 when the mold section 34 is in its first position shown in FIG. 2. By virtue of this construction, the mold section 34 can be pivoted around the horizontal axis of the pivot 44 to a position wherein the axis 48 of the neck 38 coincides with the axis 46 of the blow pin 18, as is shown in FIG. 3 in the second position of the mold section 34.

With the mold section 34 in the position shown in FIG. 3, the blow pin 18 can be advanced axially so that its finish head 20 penetrates the neck 38 to compression mold the neck of the container and also to allow air to be introduced into the parison 22 to blow the parison to the finished shape of the container.

Figure 2:
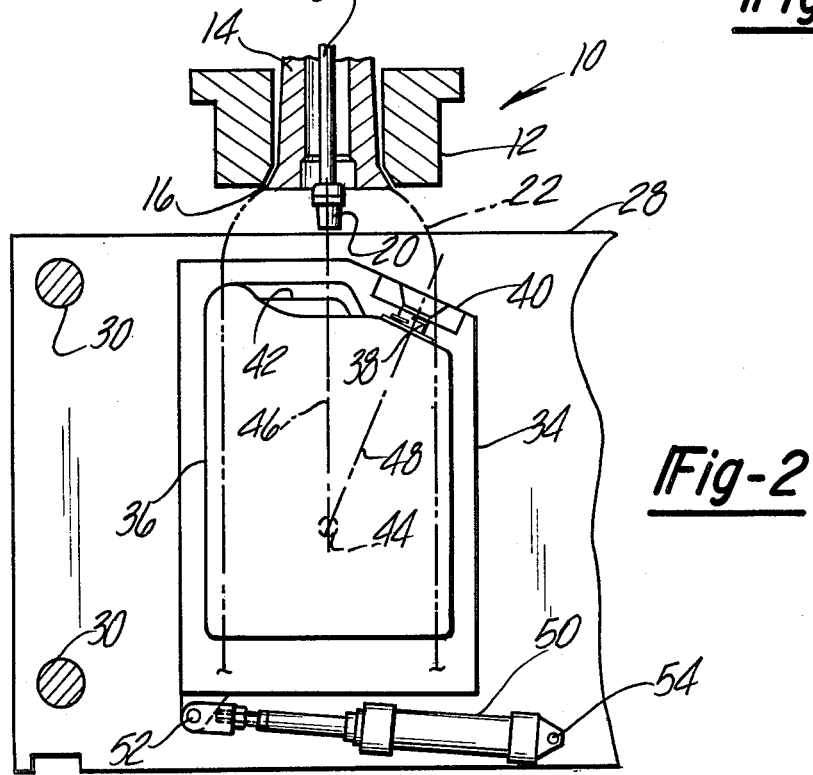
FIG. 2 is a fragmentary sectional view taken on the line 2—2 of FIG. 1.

For the purpose of moving the mold section between its first position of FIG. 2 and its second position of FIGS. 3 and 4, a fluid cylinder assembly 50 is provided. The fluid cylinder assembly 50 is mounted so that it is pivotally connected to the mold section 34 at the pivot pin 52 and to the platen 28 at the pivot pin 54. Expansion of the cylinder assembly 50 to the position shown in FIG. 2 will maintain the mold section 34 in its first position, and contraction of the cylinder assembly 50 to the position shown in FIG. 3 will result in maintaining mold section 34 in its second position.

In the normal operation of the apparatus embodying the present invention, the parison 22 is extruded from the annular orifice 16 between open mold sections 32 and 34 while the blow pin 18 is in its retracted position shown in FIGS. 1–3, and the molds are then closed enough to pinch the parison 22 between the inner faces of the mold sections 32 and 34, but the platens 26 and 28 are not locked up. As is understood in the art, it is conventional procedure to move the platens together at a relatively low pressure of a mechanical or fluid actuating system, and thereafter, prior to the blowing operation being performed, the mold sections are clamped tightly together by applying high pressure to the mechanical or fluid actuating system. In the present invention, the high pressure for locking the platens together is not applied until after the fluid actuating clyinders 50 have been actuated to pivot the mold sections 32 and 34 to the position shown in FIGS. 3 and 4. After the pivoting operation has been completed, the platens are actuated into their locked positions, and the prefinish blow pin 18 is rammed down and the neck is prefinished and the container is blown. The blow pin 18 is then retracted, and the mold sections 32 and 34 are rotated to their original positions while the platens 26 and 28 are moved to their open positions. The container is next removed, and the cycle is repeated.

It is claimed:

1. A method of blow molding a container with an angular neck having an upper opening from a parison of thermoplastic material that is positioned between open mold sections and about a blow pin having a vertical axis, said mold sections when closed and in their upright positions defining a cavity of the shape of said container with the axis of the angular neck being angularly disposed to said vertical axis, and said parison being sufficiently wide so that it encompasses the neck opening in the mold cavity when the mold sections are closed onto the parison, characterized by closing the mold sections onto said parison, moving the closed mold sections relative to said vertical axis until said neck axis coincides with the axis of said blow pin, advancing said blow pin axially into the angular neck of said cavity and blowing the parison to the shape of the cavity, and thereafter opening said mold sections and removing the blown container.

2. A method of blow molding a container with an angular neck having an upper opening from a parison of thermoplastic material that is positioned between open mold sections and about a blow pin having a vertical axis, said mold sections when closed and in their upright positions defining a cavity of the shape of said container with the axis of the angular neck being angularly disposed to and intersecting said vertical axis, and said parison being sufficiently wide so that it encompasses the neck opening in the mold cavity when the mold sections are closed onto the parison, characterized by closing the mold sections onto said parison, pivoting the closed mold sections around a horizontal axis extending through said intersection of the vertical axis and the neck axis until said neck axis coincides with the axis of said blow pin, advancing said blow pin axially into the angular neck of said cavity and blowing the parison to the shape of the cavity, and thereafter opening said mold sections and removing the blown container.

3. The method that is defined in claim 2, characterized in that said blow pin has a finish head, and the step of advancing said blow pin axially into the angular neck of the cavity includes ramming down thermoplastic material into the angular neck of the cavity to finish the neck of the container.

4. The method that is defined in claim 2, characterized in that said mold sections are pivotally mounted on platens, and the step of closing the mold sections includes pinching the parison but not locking the platens, and said platens are actuated to locked positions after the closed mold sections have been pivoted.

5. The method that is defined in claim 2, characterized in that said blow pin is retracted when the blowing of the parison has been completed.

6. The method that is defined in claim 2, characterized in that said mold sections are pivoted back to their upright positions while said mold sections are opening.

7. A method of blow molding a container with an angular neck having an upper opening from a parison of thermoplastic material, wherein said parison is extruded between open mold sections from an extrusion head having an annular extrusion orifice and an axially moveable blow pin coaxially extending through said orifice, said blow pin having a finish head at its end, and said mold sections are mounted on platens for movement to open and closed positions, said mold sections when closed and in first positions defining a cavity of the shape of said container with the axis of the angular neck being angularly disposed to and intersecting said vertical axis, and said parison being sufficiently wide so that it encompasses the neck opening in the mold cavity when the mold sections are closed onto the parison, characterized in that said mold sections are pivotally mounted on said platens with the pivot axis extending horizontally through the point of intersection of the neck axis and the vertical axis, and comprising the steps of closing the open mold sections onto said parison sufficient to pinch the parison, pivoting the closed mold sections about said pivot axis to a second position wherein the neck axis coincides with the axis of said blow pin, axially advancing the blow pin so that its finish head rams into the neck of the mold sections to compression mold the neck of the container, blowing the parison to the shape of the cavity, retracting the blow pin, and opening said mold sections to discharge the blown container.

8. The method that is defined in claim 7, characterized by locking said platens after said mold sections are in said second position, and unlocking said platens after the blowing step has been completed.

9. The method that is defined in claim 8, characterized by pivoting the mold sections back to said first position while said mold sections are being opened.

10. Apparatus for blow molding a container with an angular neck having a upper opening from a parison of thermoplastic material, comprising an extrusion head having an extrusion orifice with a vertical axis and an axially moveable blow pin coaxially extending through said orifice, means for advancing and retracting the blow pin, means for introducing blowing fluid to the blow pin, a pair of mold sections mounted on platens below said orifice and moveable between an open position for receiving said parison therebetween and a closed position to pinch the parison therebetween, said mold sections defining when closed a cavity of the shape of said container with the axis of the angular neck being angularly disposed with respect to and intersecting said vertical axis, and said extrusion orifice having a shape and dimension so that the parison extruded therefrom is sufficiently wide so that it encompasses the neck opening in the mold cavity when the mold sections are closed onto the parison, characterized in that said mold sections are mounted on said platens for relative movement between first positions wherein said neck axis is angularly disposed relative to said vertical axis and second positions wherein said neck axis coincides with the axis of said blow pin, and actuating means operatively connected between said mold sections and said platens for moving said mold sections to either of said positions.

11. Apparatus that is defined in claim 10, and further characterized in that said mold sections are pivotally mounted on said platens with the pivot axis extending horizontally through the point of intersection of the neck axis and said vertical axis.

12. The apparatus that is defined in claim 10, wherein said blow pin has a finish head at its lower end, and further characterized in that said blow pin is axially moveable into the angular neck of said cavity after said actuating means have moved said mold sections to said second positions so that the neck of the container can be compression molded and a blowing medium can be introduced into said parison.

* * * * *